United States Patent
Redmann (10) Patent No.: US 7,861,822 B2
(45) Date of Patent: Jan. 4, 2011

(54) ENGINE NOISE REDUCTION APPARATUS

(75) Inventor: Michael A. Redmann, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 532 days.

(21) Appl. No.: 11/511,577

(22) Filed: Aug. 29, 2006

(65) Prior Publication Data
US 2008/0053312 A1 Mar. 6, 2008

(51) Int. Cl.
F02B 77/13 (2006.01)
F01N 1/24 (2006.01)

(52) U.S. Cl. ............... 181/204; 123/198 E; 180/68.1; 181/200; 296/39.3

(58) Field of Classification Search ............ 96/380, 96/381, 383; 123/198 E; 180/68.1, 68.4, 180/69.2, 69.22; 181/200, 203, 204, 210, 181/256; 296/39.3
See application file for complete search history.

(56) References Cited

U.S. PATENT DOCUMENTS

| | | | | |
|---|---|---|---|---|
| 3,147,814 A | * | 9/1964 | Suhre | 180/68.1 |
| 3,774,710 A | * | 11/1973 | Gustavsson | 180/68.1 |
| 3,866,580 A | | 2/1975 | Whitehurst et al. | |
| 3,882,951 A | * | 5/1975 | Conley | 180/294 |
| 3,964,462 A | * | 6/1976 | Thien et al. | 123/198 E |
| 4,071,009 A | * | 1/1978 | Kraina | 123/198 E |
| 4,086,976 A | | 5/1978 | Holm et al. | |
| RE29,923 E | * | 3/1979 | Thien et al. | 123/198 E |
| 4,149,512 A | * | 4/1979 | Hatz | 123/198 E |
| 4,194,484 A | * | 3/1980 | Kirchweger et al. | 123/195 C |
| 4,197,826 A | * | 4/1980 | Fachbach et al. | 123/198 E |
| 4,203,407 A | * | 5/1980 | Fachbach et al. | 123/198 E |
| 4,503,931 A | * | 3/1985 | Sugimoto et al. | 181/204 |
| 4,811,700 A | * | 3/1989 | Fricker | 123/198 E |
| 4,854,278 A | | 8/1989 | Honecker et al. | |
| 4,891,940 A | * | 1/1990 | Tamba et al. | 60/320 |
| 5,285,863 A | * | 2/1994 | Miki | 180/68.2 |
| 5,297,517 A | * | 3/1994 | Brandt et al. | 123/198 F |
| 5,692,467 A | | 12/1997 | Sahm et al. | |
| 5,704,643 A | * | 1/1998 | Yamanaka et al. | 280/781 |
| 6,491,133 B2 | * | 12/2002 | Yamada et al. | 181/200 |
| 6,655,486 B2 | | 12/2003 | Oshikawa et al. | |
| 6,662,892 B2 | * | 12/2003 | Falk et al. | 180/68.1 |
| 7,107,943 B2 | * | 9/2006 | Yasuda et al. | 123/41.62 |
| 7,131,422 B2 | * | 11/2006 | Kimura et al. | 123/198 E |

FOREIGN PATENT DOCUMENTS

| | | |
|---|---|---|
| EP | 0074941 | 3/1983 |
| JP | 59074327 | 4/1984 |
| JP | 10210841 | 8/1998 |

* cited by examiner

*Primary Examiner*—Michael A Marcheschi
*Assistant Examiner*—Robert A Clemente
(74) *Attorney, Agent, or Firm*—Finnegan, Henderson, Farabow, Garrett & Dunner LLP (57) ABSTRACT

A vehicle including an enclosure and a separator wall is disclosed. The enclosure defines an engine compartment and the engine compartment encloses an internal combustion engine. The separator wall extends from a forward portion of the engine compartment to a rear portion of the engine compartment. The engine compartment is at least partially separated into an upper portion and a lower portion by the separator wall.

18 Claims, 6 Drawing Sheets

ENGINE NOISE REDUCTION APPARATUS

TECHNICAL FIELD

The present disclosure relates generally to an engine noise reduction apparatus and more particularly to a partial enclosure resulting in improved noise restriction.

BACKGROUND

The subject of noise pollution has become a critical issue in recent years and has had a very significant impact on the earthmoving industry. Rigid sound requirements for equipment have been adopted worldwide, resulting in extensive modifications to vehicles in an attempt to reduce the noise produced during their operation. Obviously, one of the primary sources of noise emanates from the engine of the vehicle. The most logical way to reduce the noise is to encase the engine in an enclosure that is lined with acoustical foam or other sound absorptive material. While this solution appears simple enough, one must remain aware of the cooling requirements for the engine and other powertrain components such as torque converters, hydraulic pumps, etc., whose heat exchangers are cooled by air passing through the engine's enclosure. It is not uncommon for the ventilation air moving through an engine enclosure of an earthmoving vehicle to pick up a heat load equivalent to approximately 20% of the output power. Therefore it is an absolute necessity to provide openings in the enclosure of sufficient size to not only reduce the temperature of the components within the enclosure but to also provide a flow of air through a radiator and various heat exchangers to cool fluid that is circulated internally through the engine and related components.

This flow of air has conventionally been provided by an axial fan that is positioned behind, or in front of, the radiator and heat exchangers to draw ambient air from outside the enclosure through the enclosure and the fluid cooling devices. Arrangements of this type have been used successfully to attenuate a large portion of the noise that escapes from an engine enclosure. However, as the noise requirements have become more stringent, problems with this method of noise attenuation have been encountered. A logical solution to the more stringent requirement is to increase the amount of sound absorptive material within the enclosure and to reduce the number and/or size of openings in the enclosure through which noise may escape. When this happens, the flow of cooling air into the enclosure is reduced to a point of inadequacy. Not only is the flow of air that is passed by the fluid cooling devices reduced, but the flow of air through the enclosure itself is reduced which results in an overall increase in temperature within the compartment. This adversely affects many temperature sensitive components, such as the alternator, the fuel injection system and various electronic components such as microprocessors that have been incorporated into the operation of an engine through modern day engine technology. To increase the flow of air, it has been common practice to provide a fan that will rotate at a greater speed. While this solution has achieved moderate success, conditions have reached a point where the fan speed requirements are so great that the noise created by the fan has surpassed the engine as the dominant noise source, particularly at high idle with an engine driven fan.

The next step in the evolution of the sound suppressed engine compartment resulted in the separation of the radiator and fluid cooling devices, including the fan, from the engine and its related components. One such design is disclosed in U.S. Pat. No. 3,866,580 issued to Whitehurst et al. The design of Whitehurst provides a wall between the fluid cooling components and the engine related components. Ambient air outside the enclosure is drawn through openings in the side and top of the enclosure by an engine driven fan. The flow of air passes through the fluid cooling components that are positioned on the engine side of the fan. The enclosure is ventilated by ambient air that is drawn from air inlets positioned at the rear and sides of the vehicle by a pressure differential created by the relationship between the engine exhaust pipe and the enclosure exhaust stack. As exhaust gasses are expelled from the engine into the exhaust stack, a pressure differential or a "venturi effect" is created that draws air through the engine enclosure. This requires relatively large openings in the engine compartment, however, to provide adequate air flow; and thus, highly efficient noise attenuation is sacrificed. Also, the flow of air is not controllable and is only effective while the engine is running. With a tightly sealed, sound suppressed engine enclosure, the temperature rise experienced within the enclosure after engine shut down can result in premature failure of temperature sensitive components such as microprocessors.

Another design that discloses separated compartments for the engine related components and the fluid cooling components is disclosed in U.S. Pat. No. 4,086,976 issued to Holm et al. Holm is similar in function to Whitehurst in the method of ventilating the two compartments. A flow of ambient air is drawn through the fluid cooling components by an engine driven fan, and the engine compartment is ventilated via a similar pressure differential created by the flow of exhaust gasses from an exhaust pipe of the engine. A conduit extends between the engine compartment and the compartment housing the engine driven fan so that the fan may also be utilized to ventilate the engine compartment. This design exhibits the same deficiencies discussed with respect to the Whitehurst design. Additionally, since a fan is a volumetric flow device and the airflow through the conduit enters the fan inlet air stream, the fan speed must be increased above that speed sufficient to satisfy the fluid cooling device airflow requirements, thereby resulting in a fan noise penalty.

Yet another design that utilizes separate compartments between the engine and related drive component and the fluid cooling components is disclosed in U.S. Pat. No. 4,854,278 issued to Honecker, and U.S. Pat. No. 5,692,467 issued to Sahm et al. This design utilizes a fan in the fluid cooling compartment to draw air from openings in the front of the vehicle, through the engine compartment and into the fluid cooling compartment. The air from the engine compartment is then mixed with ambient air drawn in through the top of the fluid cooling component compartment upstream from the radiator and heat exchangers. Again the design exhibits many of the deficiencies pointed out with respect to the designs described above. Additionally, it must be noted that the heated air from the engine compartment will increase the overall temperature of the air drawn through the fluid cooling devices. Since the performance of a heat exchanger is proportional to the difference in inlet temperature between the air and the fluid, cooling efficiency is sacrificed.

The present disclosure is directed to overcoming one or more of the problems or disadvantages existing in the prior art.

SUMMARY OF THE DISCLOSURE

In one aspect, a vehicle including an enclosure and a separator wall is disclosed. The enclosure defines an engine compartment and the engine compartment encloses an internal combustion engine. The separator wall extends from a forward portion of the engine compartment to a rear portion of the engine compartment. The engine compartment is at least partially separated into an upper portion and a lower portion by the separator wall.

In another aspect, an engine noise reduction apparatus for a vehicle having an internal combustion engine is disclosed. The apparatus includes a separator wall extending generally horizontally from a forward portion of an engine compartment to a rear portion of the engine compartment thereby separating the engine compartment into an upper portion and a lower portion. The upper portion of the engine compartment contains at least noise suppression and cooling apparatuses, and the lower portion of the engine compartment contains at least the engine and drive train components.

In another aspect, a method of reducing engine noise on a vehicle is disclosed. The method includes providing an internal combustion engine supported on a vehicle and substantially enclosing the engine in an enclosure, providing a separator wall within the enclosure, the separator wall separating the enclosure into an upper portion and a lower portion such that the upper portion of the engine compartment contains noise suppression and cooling apparatuses and the lower portion of the engine compartment contains the engine and drive train components.

DETAILED DESCRIPTION

Figure 1:
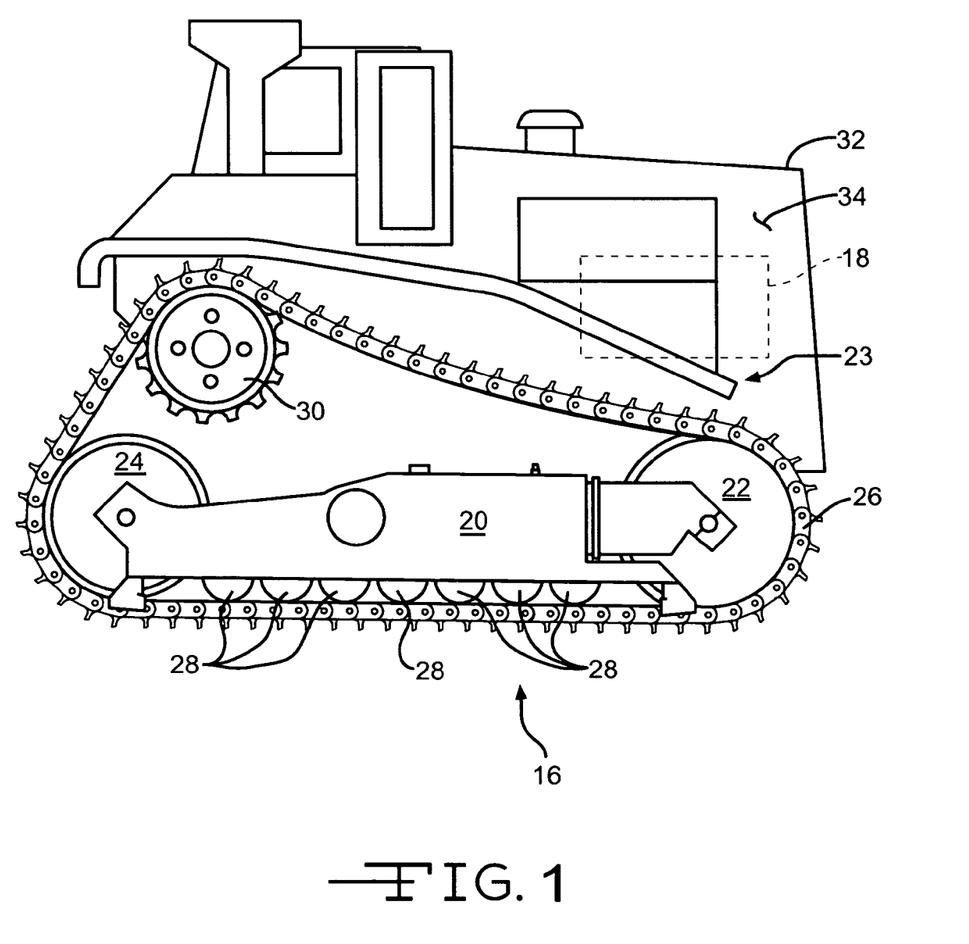
FIG. 1 is an illustration of a vehicle on which the present invention is used.

Referring to FIG. 1, a vehicle such as a track type tractor includes an engine 18 (shown schematically). The engine 18 drivingly engages a powertrain or drivetrain that is coupled to an undercarriage assembly 16, for propelling the vehicle about the ground. The undercarriage assembly 16 including a right side, seen in FIG. 1, and a left side (not shown) is attached to the vehicle. The undercarriage assembly 16 includes a frame rail 20 having a front idler 22 and a rear idler 24 mounted thereupon. Pluralities of bogie wheels 28 are positioned below the frame rail 20 to support the vehicle on the track assembly 26. A drive sprocket 30 is positioned above the undercarriage assembly 16 and is drivingly coupled to the engine 18. The track assembly 26 encompasses the undercarriage assembly 16 and engages the drive sprocket 30, front idler 22, rear idler 24, and bogie wheels 28. The engine 18 is housed within an enclosure 32 that defines an engine compartment 34. Positioned within the engine compartment 34 are a plurality of drivetrain components, indicated generally at 23, including the engine 18, a torque converter and a transmission (not shown) that are utilized to provide power to the drive sprocket 30 which in turn mobilizes the vehicle.

Figure 2:
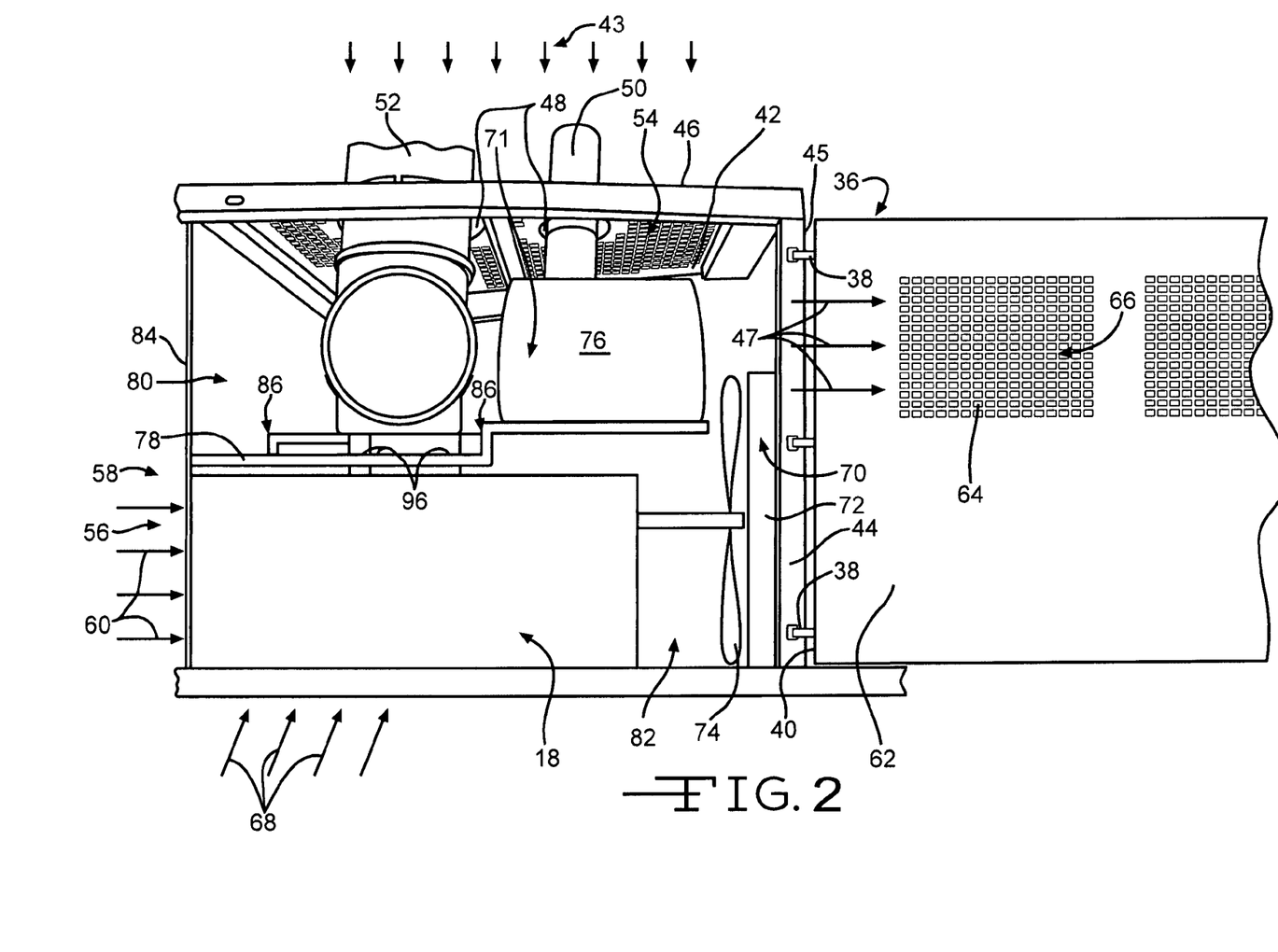
FIG. 2 is an enlarged view of a portion of the enclosure of the vehicle shown in FIG. 1.

Illustrated in FIG. 2 is an enlarged view of the enclosure 32 of the tractor 12 shown in FIG. 1. As shown, the enclosure 32 is provided to substantially cover the engine 18 and drivetrain components 23 on all sides. The enclosure includes an enclosure frame 44 that is configured to support enclosure panels and define the outer perimeter of the enclosure 32. The enclosure 32 includes a pair of substantially vertically oriented side panels 36 that are individually moveable about a hinge mechanism 38 respectively at their forward edge 40. It should be appreciated that the enclosure 32 can be mounted on the enclosure frame 44 such that the entire enclosure 32 can be pivoted about a hinge mechanism (not shown), or such that the individual side panels 36 are pivotable relative to the enclosure frame 44 in any desired direction or in any suitable manner. As shown, the side panel 36 may be moved between a first, closed position (illustrated in FIG. 1) and a second, open position (illustrated in FIG. 2) by manipulation of a latch assembly (not shown). The panels 36 can also be completely removed if it is so desired. When open, complete or substantial access is afforded to the engine 18 and related drivetrain components 23, as well as other components therein, for service and repair. When the side panels 36 are closed, they act as a partial barrier to contain the noise created by the operation of the engine and related components within the enclosure 32.

The enclosure 32 also includes a generally horizontal upper panel 42 that is connected to the enclosure frame 44, or alternatively could be directly connected to the side panels 36. The upper panel 42 defines the upper surface 46 of the enclosure 32. The upper panel 42 is fixed to the enclosure frame 44 of the tractor 12 in the illustrated embodiment. However, it can be appreciated that the upper panel 42 can be pivotable relative to the enclosure frame 44 if it is so desired. The upper panel 42 includes a plurality of openings 48 to accommodate an exhaust stack 50, air intake assembly 52, and other engine related components. The upper panel 42 can also include openings 54 or perforations that facilitate the flow of air into the engine compartment 34 as will be described in greater detail below. Such a structure is also known to one skilled in the art.

A front panel, or forward grill 45, is located at the front of the tractor 12 at the forward portion 92 of the engine compartment 34. The forward grill 45 also defines the front of the enclosure 32 and includes a plurality of openings through the grill 45. As indicated by the arrows 47 (seen in FIG. 3), the openings through the forward grill 45 allow air to exit through the radiator 72 and out of the engine compartment 34. The forward grill 45 can be moveable or removable in a manner that is similar to that described above with respect to the side panels 36 if it is so desired.

In addition to the flow of air through the upper panel 42, indicated generally by arrows 43, the flow of air into the engine compartment is also achieved from the rearward portion 56 of the enclosure 32. Ambient air from outside the enclosure 32 can be communicated to the components within the engine compartment 34 via openings 58 at the rearward portion 56 of the enclosure 32. Ambient air could then flow into the engine compartment 34 as shown by the arrows 60. The side panels 36 can include ventilation apparatuses (not shown) defining air passageways or channels that are mounted to the inner surface 62 of the side panels 36 that direct the flow of air from the rearward portion 56 of the enclosure 32 into the engine compartment 34. Additionally, each side panel 36 includes at least one grill 64, or a plurality of grills, that include openings 66 or perforations which allow air to flow into or out of the engine compartment 34, as shown generally by arrows 68.

Also positioned within the engine compartment 34 are fluid cooling apparatuses, indicated generally at 70. The fluid cooling apparatuses 70 typically include a radiator 72 and fan assembly 74 for cooling water, or other fluids, which are circulated through the engine 18. The fluid cooling apparatuses 70 can include additional heat exchangers (not shown) for fluids that circulate through the transmission or other hydraulic systems. The engine compartment 34 also contains a muffler 76 (or other noise suppression apparatuses) and exhaust cleaning or filter apparatuses, such as a diesel particulate filter (not shown) and an intake air filter assembly 52. The muffler 76 and intake air filter assembly 52 are referred to generally as noise suppression apparatuses, indicated generally at 71.

According to the embodiment illustrated in FIG. 2, the enclosure 32 is divided into two compartments by a separator wall 78. The separator wall 78 separates the engine compartment 34 into an upper portion 80 and a lower portion 82. The lower portion 82 of the engine compartment 34 contains primarily the drivetrain components, indicated generally at 23. The upper portion 80 of the engine compartment 34 houses primarily the fluid cooling apparatuses 70, the noise suppression apparatuses, such as the muffler 76, the air filter assembly 52, and a diesel particulate filter. Depending on the arrangement and configuration of the engine 18, it is possible that components relating to the turbochargers (not shown) of the engine 18 could be positioned in either the upper portion 80 or the lower portion 82 of the engine compartment 34.

Figure 3:
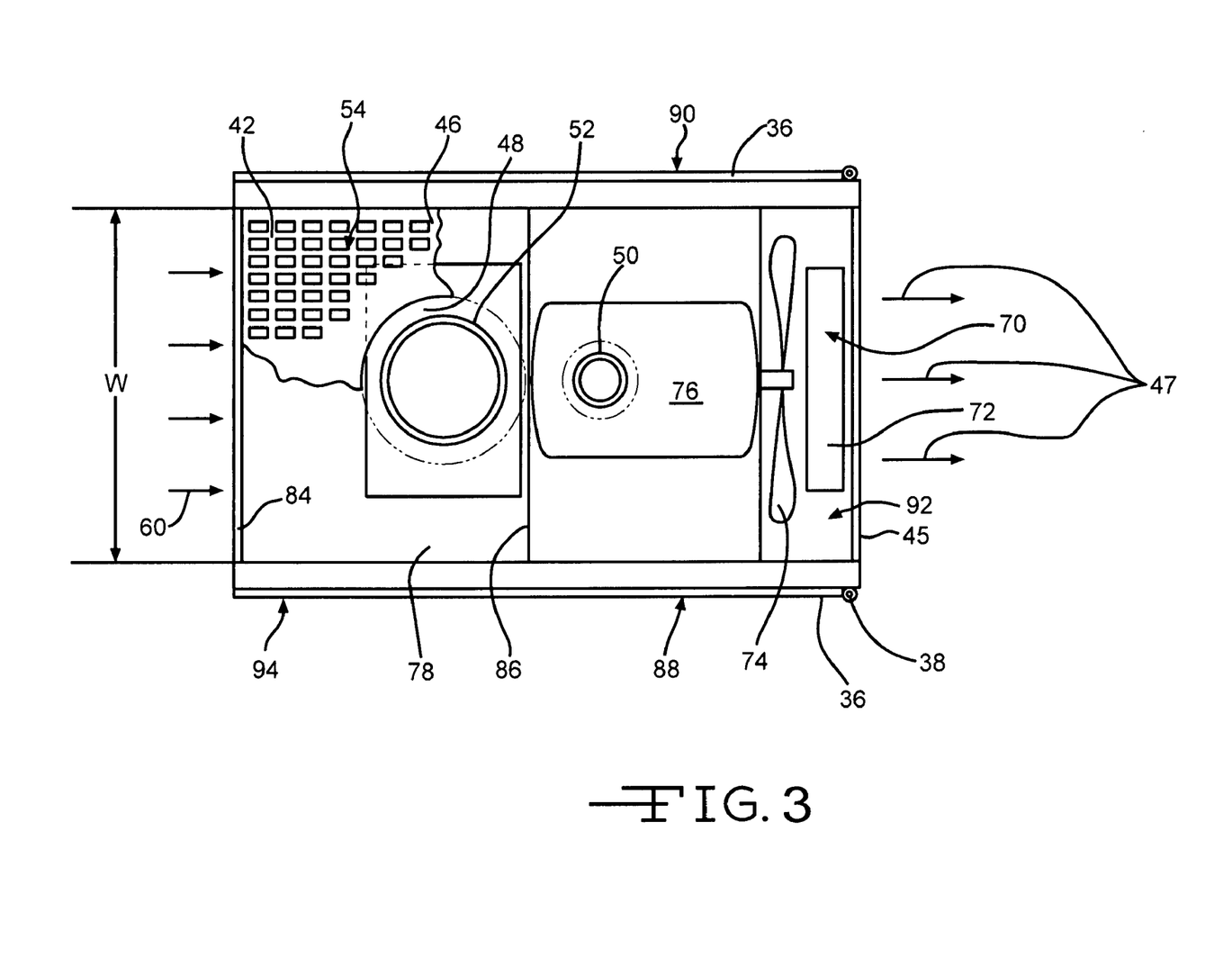
FIG. 3 is a plan view of a portion of the enclosure of the vehicle shown in FIG. 2.

Illustrated in FIG. 3 is a schematic plan view of a portion of the enclosure 32. As can be seen in FIGS. 2 and 3, the separator wall 78 is a substantially horizontal panel made of sheet metal. However, it can be appreciated that the separator wall 78 can be made of any suitable material. The separator wall 78, as shown, has a thickness of about 3 to 5 millimeters, but can have any thickness according to the exact design characteristics of a particular vehicle in which the separator wall 78 is installed. Additionally, the thickness of the separator wall 78 is a function of the space available between the various components located within the engine compartment 34.

The separator wall 78 extends from a forward portion of the engine compartment 34 to a rear portion of the engine compartment 34. At the forward portion 92 of the engine compartment 34, it is preferred that the separator wall 78 ends a short distance from the radiator 72. At the rear portion 94 of the engine compartment 34, the separator wall 78 ends at or near the firewall 84. The separator wall 78 also extends across the width, W, of the enclosure 32 between the opposed side panels 36 of the enclosure 32. Particularly, the separator wall 78 extends from a first side 88 of the enclosure 32 to the second, or opposite, side 90 of the enclosure 32.

The separator wall 78, as shown in FIGS. 2 and 3, is substantially horizontal and substantially planar across its width, but also includes one or more stepped portions 86. The stepped portions 86 are included primarily to accommodate the various components that are located within the engine compartment 34. In particular, the separator wall 78 includes the stepped portions 86 to accommodate the configuration and positions of the engine 18 and drive train components 23, as well as the noise suppression apparatuses 71 and fluid cooling apparatuses 70. As shown, at least a portion of the separator wall 78 rests atop a valve cover (not shown) of the engine 18. As such, the engine 18 provides structural support for the separator wall 78. If it is so desired, the separator wall 78 can be supported on slats (not shown) or other structures that support the separator wall 78 across its width. Apertures 96 can be formed through the separator wall 78 to allow the engine 18 and drive train components 23 to interconnect to the noise suppression apparatuses 71 and fluid cooling apparatuses 70. In addition, there can be other apertures 96 in the separator wall 78 to accommodate other components within the engine compartment 34 that extend between the upper portion 80 of the engine compartment 34 and the lower portion 82 of the engine compartment.

It should be appreciated that the exact materials, structure, shape, and location of such sealing mechanisms are not described in detail as they are generally known in the art, or their use would be evident to one skilled in the art.

INDUSTRIAL APPLICABILITY

In the operation of an engine 18, high levels of heat and noise are typically generated within the engine compartment 34, as was described above. However, as was also described above, a separated air system does not adequately allow for engine cooling while maintaining an adequate level of noise reduction. This is accomplished, however, by using the separator wall 78 according to the illustrated embodiments. The separator wall 78 is positioned such that it separates the engine compartment 34 into an upper portion 80 and a lower portion 82, thereby creating a semi-separate air system.

According to the illustrated embodiments, the engine 18 is positioned relatively low in the chassis. Therefore, placement of the separator wall 78 can be below the openings 66 of the grills 64 of the side panels 36. Placement of the separator wall 78 over the engine 18 in this manner reduces or prevents engine noise from escaping through the enclosure 32 through the openings 66 of the grills 64 of side panels 36. Additionally, the separator wall 78 further separates the engine 18 from the upper panel 42 thereby limiting the passage of noise through the openings 54 therein. Thus, the engine noise is substantially contained below the separator wall 78 without substantially restricting airflow as will be described below.

Figure 4:
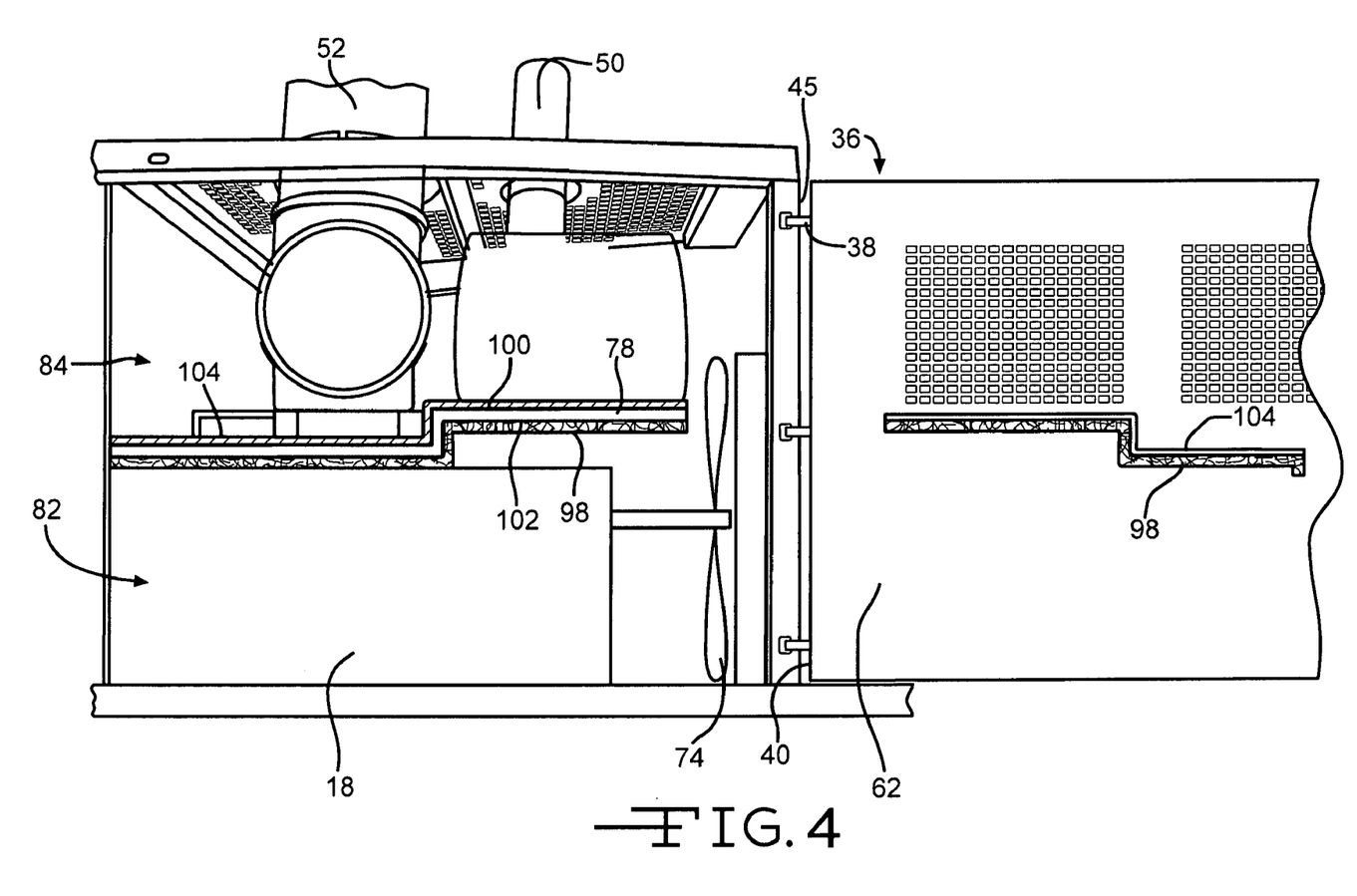
FIG. 4 is an enlarged view of a portion of the enclosure of the vehicle shown in FIG. 1 according to an alternate embodiment.

The amount of noise emanating from the engine compartment 34 can be further reduced by the implementation of sound control materials in conjunction with the separator wall 78. Specifically, as shown in FIG. 4, the separator wall 78 is covered on at least one surface with a noise abatement material 98. In the illustrated embodiment, the noise abatement material 98 is attached to a lower surface 102 of the separator wall 78. It can be appreciated that the noise abatement material 98 could be attached to an upper surface 100 of the separator wall 78, or to both the upper surface 100 and lower surface 102 of the separator wall 78.

As can also be seen in FIG. 4, a portion of the panels 36, 42 and enclosure frame 44 of the enclosure 32 can also be covered with the noise abatement material 98. As shown, the noise abatement material 98 is located on the inner surface 62 of the side panel 36 corresponding to the lateral edges of the separator wall 78 such that when the side panel 36 is closed, the noise abatement materials 98 on the side panel 36 abuts against the edges of the separator wall 78, in effect "sealing" the noise below the separator wall 78. Therefore, the lower portion 82 of the engine compartment 34 where the loudest components are located is at least partially separated from the upper portion 80 of the engine compartment 34. It can be appreciated that additional noise abatement materials 98 can be placed anywhere on the side panels 36, or inside the engine compartment 34 to reduce the total amount of noise without restricting air flow through the compartment 34. Therefore, it is preferred that the noise abatement materials 98 do not cover the grill 64.

The noise abatement material 98 can be any material capable of reducing noise or deflecting sound waves from the engine 18 and drive train components 23. The materials 98 should also be capable of withstanding the temperatures and other conditions that are encountered within the engine compartment 34. Examples of noise abatement materials 98 that can be used according the disclosure herein are foam rubber, open cell foam, or fiberglass. The noise abatement materials 98 can have any desired thickness as used with the embodiments described herein. It should be appreciated that any combination of these materials could be used as the noise abatement materials 98 or any other suitable materials could also be used without departing from the scope of this disclosure.

To reduce or prevent heat from the lower portion 82 of the engine compartment 34 reaching the upper portion 80 of the engine compartment 34, the separator wall 78 includes at least one surface covered with temperature resistant material 104. In the illustrated embodiment, the temperature resistant material 104 is attached to the upper surface 100 of the separator wall 78. It can be appreciated that the temperature resistant material 104 could be attached to the lower surface 102 of the separator wall 78, or to both the upper surface 100 and lower surface 102 of the separator wall 78. In addition, if it were so desired, a portion of the panels 36, 42 and enclosure frame 44 of the enclosure 32 could be covered with the temperature resistant material 104. As shown, the temperature resistant material 104 is located primarily in the upper portion 80 of the engine compartment 34 to separate the hottest components from the remainder of the engine compartment 34. However, other portions of the enclosure 32 can be covered (completely or partially) with the temperature resistant material 104 if it is so desired.

According to the illustrated embodiments, and contrary to prior art designs, separation of the engine 18 and related components from the cooling components does not decrease the overall cooling and noise reduction performance of the vehicle. Cooling and noise reduction are improved with the designs shown in illustrated embodiments. Noise reduction is accomplished as described above. Cooling is accomplished in the lower portion 82 of the engine compartment by the passage of ambient air that is communicated to the components within the lower portion 82 of the engine compartment 34 via openings 58 at the rearward portion 56 of the enclosure 32. This ambient air flows into the engine compartment 34 as shown by the arrows 60 in FIG. 2. The air passes from the rearward portion 56, past the engine 18, and through the radiator 72. Additionally, ambient air enters the upper portion 80 of the engine compartment 34 through the openings 54 in the upper panel 42 and through the openings 66 of the grills 64 of side panels 36 and through the radiator. This air, which conventionally would have been heated by the engine 18, is separated from the "hot" areas within the engine compartment 34 by the separator wall 78. Therefore, this is cooler air that will be provided to the fluid cooling apparatuses 70 than would be using conventional mechanisms.

Figure 5:
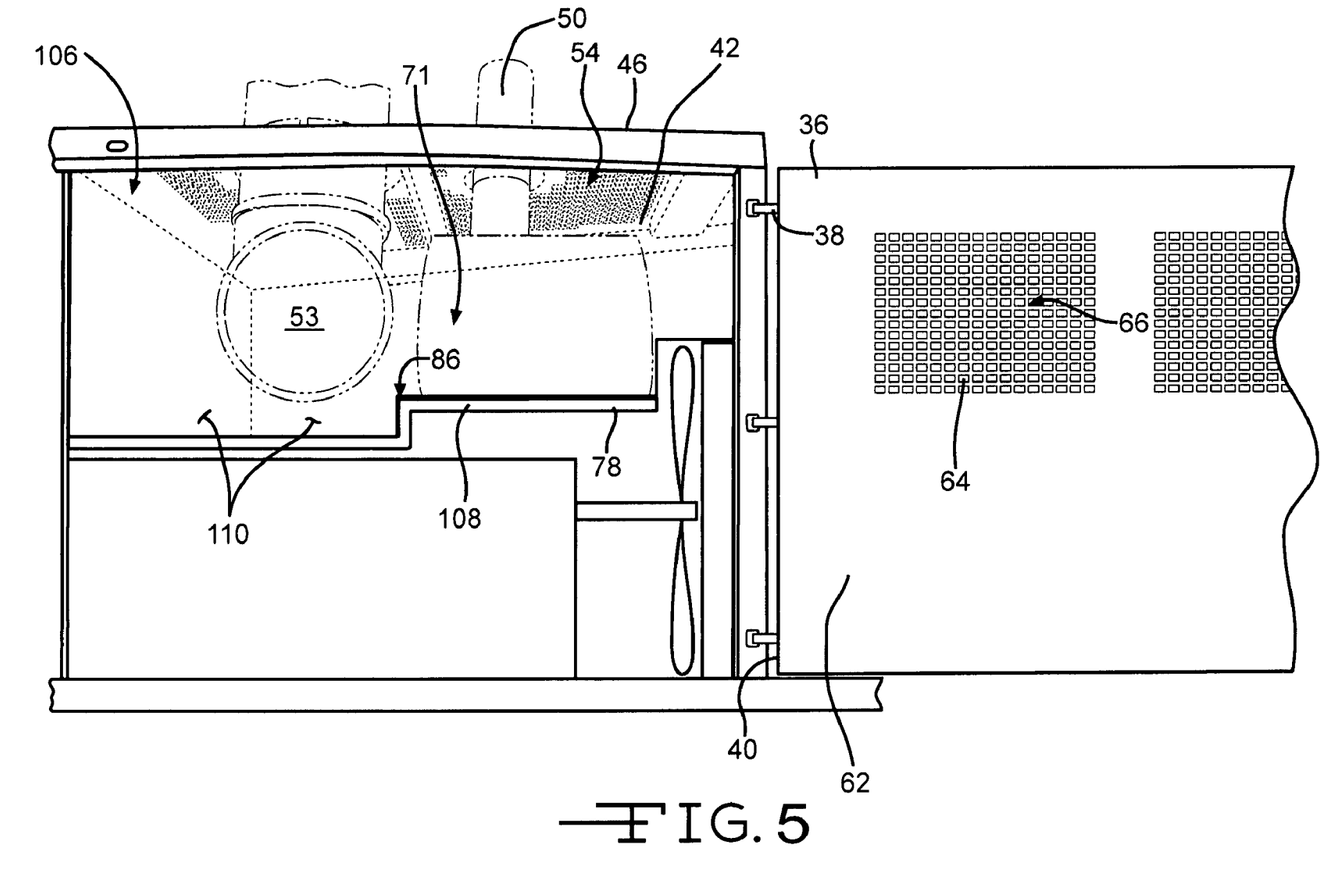
FIG. 5 is an elevation view of a portion of an enclosure of the vehicle shown in FIG. 1 according to an alternate embodiment.

According to an alternate embodiment, shown in FIG. 5, a vehicle 4-0 that is substantially similar to that described above is used. However, the noise suppression apparatuses 71 and an air filter 53 attached to the air intake assembly 52 are located within a thermal box, indicated generally at 106, within the engine compartment 34. The thermal box 106 includes generally vertically oriented panels 110 that surround the components in the upper portion 80 of the engine compartment 34. The panels 110 can extend up to the upper panel 42 or to some point lower than the upper panel 42. The thermal box 106 is defined at its lower portion 108 by the separator wall 78.

The thermal box 106 is configured primarily for vehicles that include additional aftertreatment components related to compliance with higher emissions control regulations and standards. For example, to reduce emissions, many future vehicles will include particulate filters and catalytic converters. Particulate filters typically require regeneration, which in some instances, results in the filter temperature being raised to a very high level. Therefore, the thermal box 106 can prevent this additional heat from transferring into the lower portion 82 of the engine compartment 34. Preventing heat from transferring to the lower portion 82 of the engine compartment 34 is also useful in preventing heat from damaging heat sensitive components such as electronic components (microchips, etc.). Additionally, implementation of the thermal box 106 will limit the heat transference to the radiator 72. Therefore, the additional heat that is generated within the engine compartment 34 will not substantially affect the cooling function of the radiator 72. Additionally, the panels 110 of the thermal box 106 can be covered with the temperature resistant materials 104, described above, to further reduce the amount of heat that is transferred from the thermal box 106.

Figure 6:
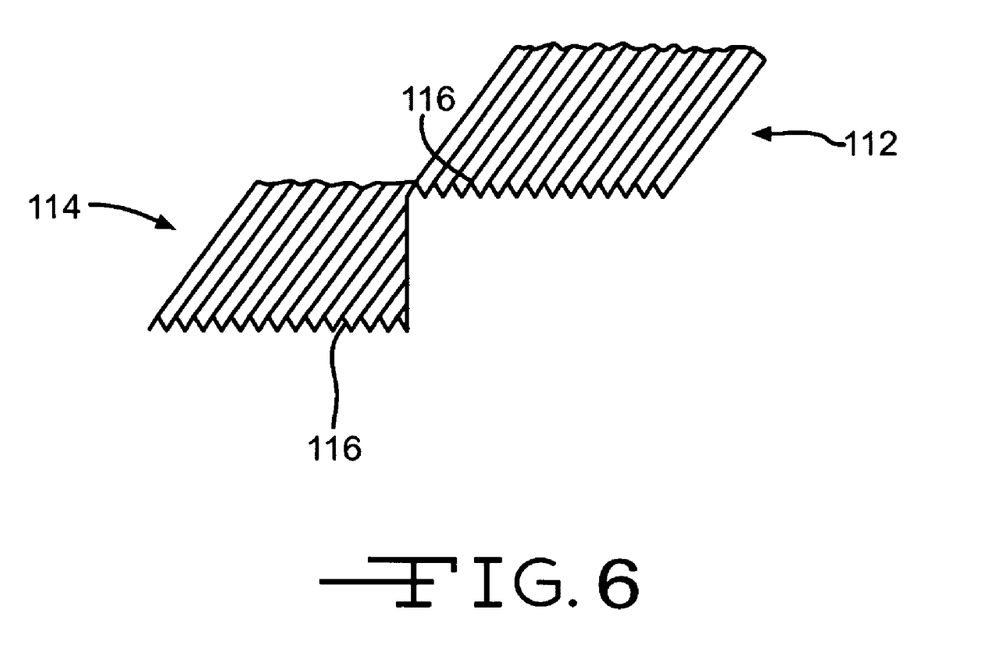
FIG. 6 is an elevation view of an alternate embodiment of a separator wall.

Illustrated in FIG. 6 is an alternate embodiment of a separator wall 112. The separator wall 112 defines a convoluted surface, indicated generally at 114. As shown, the convoluted surface 114 of the separator wall 112 is defined by a plurality of ridges 116. The ridges 116 are angled relative to a horizontal axis such that sound waves emanating from the engine 18 and drive train components 23 are dissipated and redirected as they contact the separator wall 112. Additionally, the separator wall 112 can be covered with noise abatement materials 98 and/or temperature resistant materials 104 such as were described above. Due to the space limitations between the upper portion 80 of the engine compartment 34 and lower portion 82 of the engine compartment 34, it is preferred that the separator wall 112 is relatively thin; about 3-5 mm, as was described above.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A vehicle comprising:
an enclosure defining an engine compartment, the engine compartment enclosing an internal combustion engine;
a separator wall extending from a rear portion of the engine compartment to a forward portion of the engine compartment, wherein the separator wall has at least one stepped portion therebetween and extends from a first side of the enclosure to a second side of the enclosure;
wherein the engine compartment is at least partially separated into an upper portion and a lower portion by the separator wall, wherein airflow between the upper and lower portions is prevented by the separator wall, and wherein the lower portion defines an airflow passageway providing airflow between the rear portion of the engine compartment and the forward portion of the engine compartment across a forward plane oriented transverse to a distal edge of the separator wall.

2. The vehicle defined in claim 1 wherein the upper portion of the engine compartment contains at least noise suppression and cooling apparatuses.

3. The vehicle defined in claim 1 wherein the lower portion of the engine compartment contains at least the engine and drive train components.

4. The vehicle defined in claim 1 wherein the separator wall defines substantially planar surfaces.

5. The vehicle defined in claim 1 wherein the upper portion of the engine compartment contains at least noise suppression and cooling apparatuses and the lower portion of the engine compartment contains at least the engine and drive train components; and wherein the separator wall is stepped to accommodate the engine and drive train components and the noise suppression and cooling apparatuses.

6. The vehicle defined in claim 5 wherein the separator wall includes apertures through the separator wall to allow the engine and drive train components to connect to the noise suppression and cooling apparatuses.

7. The vehicle defined in claim 1 wherein the separator wall is covered on at least one surface with a noise abatement material.

8. The vehicle defined in claim 7 wherein at least a portion of the enclosure is covered with the noise abatement material.

9. The vehicle defined in claim 1 wherein the separator wall is covered on at least one surface with a temperature resistant material.

10. The vehicle defined in claim 1 wherein the separator wall defines a convoluted surface.

11. The vehicle defined in claim 1 wherein the enclosure has at least one air opening open to the engine compartment to allow air to pass into at least one of the upper portion of the engine compartment and lower portion of the engine compartment.

12. The vehicle defined in claim 11 wherein a portion of the enclosure that surrounds the upper portion of the engine compartment defines a grill having a plurality of air openings allowing air to pass into the upper portion of the engine compartment; and a portion of the enclosure that surrounds the lower portion of the engine compartment defines a rearward opening allowing air to pass into the lower portion of the engine compartment.

13. The vehicle defined in claim 1 further comprising a plurality of substantially vertical walls extending from the separator wall, wherein the vertical walls and the separator wall define a thermal box that at least partially encloses the upper portion of the engine compartment.

14. An engine noise reduction apparatus for a vehicle having an internal combustion engine comprising:

a separator wall extending generally horizontally from a rear portion of an engine compartment to a forward portion of the engine compartment and from a first side of the enclosure to an opposite side of the enclosure thereby separating the engine compartment into an upper portion and a lower portion and preventing airflow through the separator wall between the upper and lower portions of the engine compartment, wherein the upper portion of the engine compartment contains at least noise suppression and cooling apparatuses and the lower portion of the engine compartment contains at least the engine and drive train components, wherein the separator wall has at least one stepped portion to accommodate the engine and drive train components and the noise suppression and cooling apparatuses, and wherein the lower portion defines an airflow passageway providing airflow between the rear portion of the engine compartment and the forward portion of the engine compartment across a forward plane oriented transverse to a distal edge of the separator wall.

15. The engine noise reduction apparatus defined in claim 14 wherein the separator wall is covered on at least one surface with a noise abatement material and the separator wall is covered on at least one surface with a temperature resistant material.

16. The engine noise reduction apparatus defined in claim 14 wherein the separator wall includes openings through the wall to allow the engine and drive train components to interconnect to the noise suppression and cooling apparatuses.

17. A method of reducing engine noise on a vehicle comprising:

providing an internal combustion engine supported on the vehicle and substantially enclosing the engine in an enclosure;

providing a separator wall within the enclosure extending from a rear portion of the enclosure to a forward portion of the enclosure and from a first side of the enclosure to an opposite side of the enclosure, the separator wall having at least one stepped portion therebetween, the separator wall separating the enclosure into an upper portion and a lower portion such that the upper portion of the engine compartment contains noise suppression and cooling apparatuses and the lower portion of the engine compartment contains the engine and drive train components, wherein the separator wall prevents airflow between the upper and lower portions, and wherein the lower portion defines an airflow passageway providing airflow between the rear portion of the engine compartment and the forward portion of the engine compartment across a forward plane oriented transverse to a distal edge of the separator wall.

18. The method defined in claim 17 wherein the separator wall is covered on at least one surface with a noise abatement material and the separator wall is covered on at least one surface with a temperature resistant material.

* * * * *